(12) United States Patent
Zhou et al.

(10) Patent No.: US 11,181,733 B2
(45) Date of Patent: Nov. 23, 2021

(54) METHOD FOR PREPARING ELECTROWETTING DISPLAY SUPPORT PLATE

(71) Applicants: SOUTH CHINA NORMAL UNIVERSITY, Guangdong (CN); SHENZHEN GUOHUA OPTOELECTRONICS CO., LTD., Guangdong (CN); ACADEMY OF SHENZHEN GUOHUA OPTOELECTRONICS, Guangdong (CN)

(72) Inventors: Guofu Zhou, Guangdong (CN); Hao Wu, Guangdong (CN); Yingying Dou, Guangdong (CN); Fahong Li, Guangdong (CN)

(73) Assignees: SOUTH CHINA NORMAL UNIVERSITY, Guangdong (CN); SHENZHEN GUOHUA OPTOELECTRONICS CO., LTD., Guangdong (CN); ACADEMY OF SHENZHEN GUOHUA OPTOELECTRONICS, Guangdong (CN)

(*) Notice: Subject to any disclaimer, the term of this patent is extended or adjusted under 35 U.S.C. 154(b) by 313 days.

(21) Appl. No.: 16/484,882

(22) PCT Filed: Nov. 15, 2017

(86) PCT No.: PCT/CN2017/110986
§ 371 (c)(1),
(2) Date: Aug. 9, 2019

(87) PCT Pub. No.: WO2018/149183
PCT Pub. Date: Aug. 23, 2018

(65) Prior Publication Data
US 2020/0004009 A1 Jan. 2, 2020

(30) Foreign Application Priority Data

Feb. 16, 2017 (CN) .......................... 201710084243.1

(51) Int. Cl.
*G02B 26/00* (2006.01)
(52) U.S. Cl.
CPC ................................ *G02B 26/005* (2013.01)
(58) Field of Classification Search
CPC .......... H01L 21/76838; H01L 51/0005; H01L 51/0541; H01L 21/2885; H01L 21/32134;
(Continued)

(56) References Cited

U.S. PATENT DOCUMENTS

2012/0007067 A1\* 1/2012 Kaneta ................ H01L 51/5088
257/40
2014/0110040 A1 4/2014 Cok

FOREIGN PATENT DOCUMENTS

CN 101493576 A 7/2009
CN 102804023 A 11/2012
(Continued)

OTHER PUBLICATIONS

International Search Report and Written Opinion from PCT/CN2017/110986, dated Jan. 26, 2018 (8 pages).

*Primary Examiner* — Brandi N Thomas
(74) *Attorney, Agent, or Firm* — Ware, Fressola, Maguire & Barber LLP

(57) ABSTRACT

A method for preparing an electrowetting display support plate (5), comprising the following steps: preparing a substrate (7) having an electrode layer; preparing a hydrophobic insulating layer (13) and pixel walls (20) on the substrate (7) having an electrode layer, the pixel walls (20) being made of a hydrophilic material; performing plasma etching on the substrate (7) having the pixel walls (20), the power of the plasma etching being 30-1,000 W/m$^2$; and heating the
(Continued)

substrate (7) subjected to the plasma etching, so as to recover the hydrophobicity of the hydrophobic insulating layer (13). According to the method, the technical bias that the display support plate (5) being treated by means of the plasma etching would influence the quality of the hydrophobic insulating layer (13) is eliminated.

17 Claims, 2 Drawing Sheets

(58) Field of Classification Search
CPC .......... H01L 21/76885; H01L 51/0545; H01L 51/56; H01L 21/31133; H01L 27/283; H01L 27/32; H01L 51/0012; H01L 51/002; H01L 51/0021; H01L 51/052; H01L 51/0004; H01L 21/76843; H01L 21/76852; H01L 21/76873; H01L 21/76877; H01L 51/0018; H01L 51/52; H01L 2924/00; H01L 21/288; H01L 21/32139; H01L 21/67075; H01L 21/6723; H01L 2224/02313; H01L 2224/02321; H01L 2224/32245; H01L 2224/48247; H01L 2224/73265; H01L 2924/01322; H01L 2924/181; H01L 2031/0344; H01L 2224/48091; H01L 27/3246; H01L 2924/00012; H01L 2924/00014; H01L 51/0019; H01L 51/0022; H01L 51/0023; H01L 51/0037; H01L 51/442; H01L 21/00; H01L 2224/48491; H01L 2224/49107; H01L 2224/8592; H01L 2251/5361; H01L 27/3239; H01L 27/3283; H01L 2933/0041; H01L 29/0665; H01L 29/0673; H01L 33/0095; H01L 33/50; H01L 33/62; H01L 51/0017; H01L 51/0036; H01L 51/0039; H01L 51/0043; H01L 51/0059; H01L 51/0516; H01L 51/5056; H01L 51/5088; H01L 51/5206; B41J 2202/09; B41J 2/14; B41J 2/15; B41J 2/1629; B41J 2/1631; B41J 2/1642; B41J 2002/041; B41J 2002/14346; B41J 2002/14435; B41J 2202/21; B41J 2/14314; B41J 2/14427; B41J 2/1623; B41J 2/1626; B41J 2/1628; B41J 2/1632; B41J 2/1635; B41J 2/1637; B41J 2/1639; B41J 2/1643; B41J 2/1645; B41J 2/1646; B41J 2/1648; B41J 2/16585; B41J 2/17513; B41J 2/17596; B41J 2002/14443; B41J 2/04563; B41J 2/0458; B41J 2/14129; B41J 2/16; B41J 2/1603; C25D 5/02; C25D 5/022; C25D 7/12; C25D 7/123; C25D 1/003; C25D 1/10; C25D 5/10; C25D 5/50; C25D 17/001; C25D 3/38; C25D 5/48; B01L 2300/0645; B01L 2300/0829; B01L 3/5085; B01L 2300/021; B01L 2300/0851; B01L 2300/12; B01L 9/50; B01L 9/56; B01L 2400/0427; B01L 3/50855; B01L 2400/0415; B01L 2200/0673; B01L 2300/0864; B01L 2400/086; B01L 3/0268; B01L 3/502784; B01L 2200/0647; B01L 2300/0819; B01L 2300/0861; B01L 2400/043; B01L 2400/0454; B01L 2400/0616; B01L 2400/0622; B01L 2400/0633; B01L 3/502738; B01L 2200/0642; B01L 2300/0887; B01L 2300/165; B01L 2400/049; B01L 3/0241; B01L 3/5025; B01L 2300/0825; B01L 2400/0406; B01L 2400/0421; B01L 3/5027; B01L 3/502707; B01L 3/5088; G01N 21/253; G01N 21/66; G01N 21/76; G01N 2035/042; G01N 2035/0425; G01N 2035/0494; G01N 21/645; G01N 21/69; G01N 33/54366; G01N 35/028; G01N 15/1459; G01N 15/1463; G01N 15/1484; G01N 2015/1006; G01N 2015/149; G01N 2035/1034; G01N 2035/00158; G01N 2035/1037; G01N 35/00029; G01N 35/10; G01N 35/1074; G01N 33/5438

See application file for complete search history.

(56) References Cited

FOREIGN PATENT DOCUMENTS

| CN | 103364940 A | 10/2013 |
|----|-------------|---------|
| CN | 103809282 A | 5/2014 |
| CN | 104049359 A | 9/2014 |
| CN | 106707500 A | 5/2017 |
| WO | 03071346 A1 | 8/2003 |

* cited by examiner

METHOD FOR PREPARING ELECTROWETTING DISPLAY SUPPORT PLATE

FIELD

The present disclosure relates to the field of electrowetting display technologies, and more particularly, to a method for preparing an electrowetting display support plate.

BACKGROUND

Electrowetting is a display technology by controlling the voltage to control the wettability of a substrate surface material, so as to control an ink movement. An electrowetting display device comprises a fluid chamber and an electrode structure, wherein the fluid chamber comprises a non-conductive first fluid (alkane, etc.) and a conductive second fluid (water or salt solution), and the fluids are contacted with each other and immiscible.

As described in international patent application WO 2003/071346, a wall pattern in an electrowetting chamber is arranged on a support plate, and the pattern defines an image element of a display device. The wall of the image element is made of a hydrophilic material. During a manufacturing process, an area where the image element in the support plate is located is covered by a hydrophobic layer (the hydrophobic layer must have good hydrophobicity and lipophilicity to ensure that the first fluid is spread in the whole pixel grid when a voltage is removed). By coating a wall material layer on the hydrophobic layer and patterning the wall material layer by, for example, photoetching, a wall is manufactured on the hydrophobic layer, thus defining a plurality of pixel grids, and forming a series of accommodation chambers for accommodating the first fluid, the non-conductive first fluid is filled in a display area formed by the pixel wall, and the surrounding pixel wall is used for preventing the first fluid from flowing to surrounding pixel grids, thus obtaining a stable display structure. A surface of the pixel wall needs a higher hydrophilicity, i.e., lipophobicity, to ensure that the hydrophobic first fluid does not cross over the pixel wall to flow to surrounding pixel grids.

However, the hydrophilicity of the material used to prepare the pixel wall often cannot reach an ideal state, and when the pixel wall is not hydrophilic enough, the ink can cross over the wall after the device is powered. Especially, when excessive voltage is applied or the ink in the pixel grid is too much, it is more likely to cause the ink to cross over the wall and enter adjacent pixel grids. Moreover, once the ink in one pixel grid is contacted with the ink in the adjacent pixel grid, the ink in the two pixel grids can accumulate in one pixel grid, thus causing the ink in the grid to easily cross over the wall and accumulate with the ink in other grids, thus causing a chain reaction of ink accumulation. When the ink in one pixel grid enters another pixel grid, the ink cannot be completely reset when the applied voltage is removed due to insufficient ink in the pixel grid, thus causing quality damage of the display device.

Chinese patent document CN103809282A disclosed a method for reducing occurrence of ink crossing over the wall driven by an electrowetting display module, an organic siloxane polymer layer arranged on a first electrode achieves the purpose of polarity inversion through a photo-crosslinking reaction, so that the polymer layer is transformed into a pattern layer with coplanar hydrophilic area and hydrophobic area, thus reducing the occurrence of the ink crossing over the wall driven by the electrowetting display module. However, the hydrophobic area and the hydrophilic are formed by the method are on a same plane, which still cannot effectively prevent the so-called ink jumping phenomenon. Moreover, organic siloxane has strong water absorption and thermal instability, and is easily hydrolyzed to become hydrophilic. Therefore, in order to prevent the ink from crossing over the wall, it is still necessary to find a new method.

SUMMARY

The technical problem to be solved by the present disclosure is to provide a method for preparing an electrowetting display support plate.

The technical solutions used in the present disclosure are as follows:

A method for preparing an electrowetting display support plate comprises the following steps:

preparing a substrate having an electrode layer;

preparing a hydrophobic insulating layer and pixel walls on the substrate having an electrode layer, wherein pixel walls being made of hydrophilic material;

performing plasma etching on the substrate having pixel walls, the power of the plasma etching being 30 W/m$^2$ to 1,000 W/m$^2$; and heating the substrate subjected to the plasma etching, so as to recover the hydrophobicity of the hydrophobic insulating layer.

In some detailed embodiments, the plasma etching lasts for 10 s to 300 s.

In some detailed embodiments, the thickness of the hydrophobic insulating layer subjected to the etching is 200 nm to 2000 nm.

In some detailed embodiments, the thickness of the pixel wall subjected to the etching is 2 μm to 20 μm.

In some detailed embodiments, the heating temperature of the substrate subjected to the plasma etching is 140° C. to 250° C.

In some detailed embodiments, the hydrophobic insulating layer is a single layer structure or a composite layer structure, and when the hydrophobic insulating layer is the composite layer structure, the hydrophobic insulating layer comprises a dielectric layer and a hydrophobic layer arranged on the dielectric layer.

In a preferred embodiment of the technical solution above, the hydrophobic insulating layer is the single layer structure, and the hydrophobic insulating layer is made of amorphous fluoropolymer.

In a preferred embodiment of the technical solution above, the hydrophobic insulating layer is the composite layer structure, the dielectric layer is made of fluoropolymer or inorganic material, and the hydrophobic layer is made of amorphous fluoropolymer.

In some detailed embodiments, specific steps for preparing the hydrophobic insulating layer and pixel walls on the substrate having an electrode layer comprise:

preparing the hydrophobic insulating layer on the electrode layer;

performing hydrophilic modification on the hydrophobic insulating layer; and preparing pixel walls on the modified hydrophobic insulating layer.

The present disclosure has beneficial effects as follows:

It is widely known that the hydrophilicity of material can be improved by plasma etching, but those skilled in the art believe that the hydrophobicity of the hydrophobic insulating layer will be reduced while the hydrophilicity of pixel walls is improved by plasma etching, thus destroying the function of the electrowetting device, and the hydrophobicity of the hydrophobic insulating layer can be recovered by heat treatment, but the hydrophilicity of pixel walls can be affected again by the heat treatment, so that applying plasma etching to the display support plate directly cannot solve the contradiction that pixel walls are hydrophilicity while the hydrophobic insulating layer is hydrophobicity. Therefore, those skilled in the art have the technical bias that the plasma etching cannot be applied for the preparation of the display support plate of the electrowetting device. A mask having a pixel wall pattern is used to perform local plasma etching on the pixel wall as a conventional method, but the precision of the mask prepared by machining is usually difficult to meet the pixel display precision requirements of the display in practice, precise alignment between the mask and the pixel structure is difficult to be realized, and inadequate precision of the mask or deviation in alignment can reduce the hydrophobicity of pixel walls adjacent to the hydrophobic layer, thus affecting device performance. The mask etching method is difficult in process and operation. According to the present disclosure, the power for controlling the plasma etching is found to be 30 W/m$^2$ to 1000 W/m$^2$, heat treatment is performed after the plasma etching, the hydrophobicity of the hydrophobic insulating layer can be ensured without affecting the hydrophilicity of pixel walls by controlling the temperature, the technical bias that the plasma etching of the display support plate affects the quality of the hydrophobic insulating layer is eliminated. After the display support plate is treated by the plasma etching process, the hydrophilicity of pixel walls is improved, although a part of the hydrophobic layer can be etched, after applying the heat treatment to the remaining part, the hydrophobicity of the hydrophobic insulating layer is recovered, but the pixel wall can still keep the hydrophilic property after plasma etching, since the melting temperature of the used hydrophobic insulating layer is usually lower than that of the used pixel wall material, thus the obtained display support plate can eliminate the problem that ink crosses over pixel walls. Therefore, the method is simple and easy to implement, without using a mask or being coated with a protective layer, solves the problem of dead pixel caused by ink crossing over the pixel wall, and improves the stability of a pixel switch, thus improving the quality and reliability of products.

DETAILED DESCRIPTION

Embodiment 1

Figure 1:
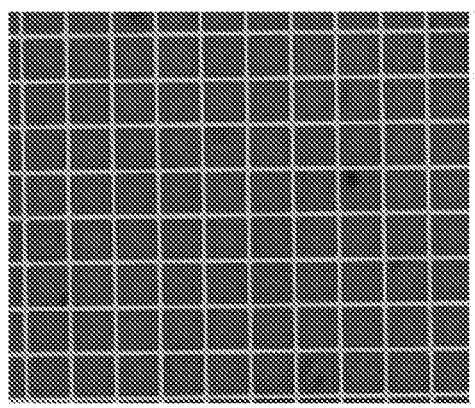
FIG. 1 illustrates an observation result of ink driven by a voltage under a microscope for an electrowetting display device according to the Embodiment 1.

Firstly, a substrate having an electrode layers is prepared; a hydrophobic insulating layer is prepared on the electrode layer, wherein the hydrophobic insulating layer is a single-layer Cytop fluororesin material with a thickness of 500 nm; hydrophilic modification is performed on the hydrophobic insulating layer; pixel walls are prepared on the modified hydrophobic insulating layer by a photoetching process, wherein pixel walls are made of hydrophilic material photoresist SU8-3005 with a thickness of 8 μm; plasma etching is performed on the substrate having the pixel wall, wherein the power of the plasma etching is 100 W/m$^2$ and the etching lasts for 100 s; and the substrate subjected to the plasma etching is baked at 180° C. to recover the hydrophobicity of the hydrophobic insulating layer, so as to obtain an electrowetting display support plate. Water droplet angle tests are respectively performed on pixel walls before the plasma etching, pixel walls after the plasma etching and pixel walls after heat treatment, and experimental results are shown in Table 1. The water droplet angle tests are respectively performed on the hydrophobic insulating layer before the hydrophilic modification, the hydrophobic insulating layer after the plasma etching and the hydrophobic insulating layer after the heat treatment, and experimental results are shown in Table 2.

TABLE 1

Water Droplet Angle Test Results of Pixel Walls [Table 1]

| Initial advancing angle | Initial receding angle | Advancing angle after etching | Receding angle after etching | Advancing angle after heat treatment | Receding angle after heat treatment |
|---|---|---|---|---|---|
| 92 ± 5° | 70 ± 5° | 15 ± 5° | 15 ± 5° | 72 ± 5° | 35 ± 5° |

TABLE 2

Water Droplet Angle Test Results of Hydrophobic Insulating Layer [Table 2]

| Initial advancing angle | Initial receding angle | Advancing angle after etching | Receding angle after etching | Advancing angle after heat treatment | Receding angle after heat treatment |
|---|---|---|---|---|---|
| 110 ± 5° | 100 ± 5° | 105 ± 5° | 45 ± 5° | 110 ± 5° | 100 ± 5° |

It can be seen from Table 1 and Table 2 that a contact angle of the pixel wall material with water in the air is a1, a contact angle of a wall material subjected to the etching with water in the air is a2, and a contact angle of the pixel wall material subjected to the heat treatment with water in the air is a3, and then a2<a3<a1. The hydrophilicity of pixel walls subjected to the etching is obviously improved, and the hydrophilicity is slightly reduced after heat treatment, but compared with the hydrophilicity before etching, the hydrophilicity of pixel walls is still improved, which indicates that the hydrophilicity after plasma etching is still retained. The hydrophobicity of the hydrophobic insulating layer is obviously reduced after etching, but the hydrophobicity is recovered after heat treatment, which indicates that the method for preparing an electrowetting display support plate according to the present disclosure can effectively improve the hydrophilicity of pixel walls on the premise of not changing the hydrophobicity of the hydrophobic insulating layer. A heating temperature is controlled to be T2, a temperature required for the hydrophobic insulating layer to recover the hydrophobicity is T1, a temperature required to change the hydrophilicity of the pixel wall material is T3; in the present embodiment, T2 is 140° C. to 250° C., and T1<T2<T3, so that the hydrophilicity of pixel walls can be improved and the hydrophobicity of the hydrophobic insulating layer is not affected at the same time.

The display support plate according to the present disclosure can be used in various electrowetting devices, such as an electrowetting display device, a lab-on-a-chip device, an electrowetting aperture, an electrowetting shutter, and the like, and is illustrated below by taking an electrowetting display device as an example.

Figure 2:
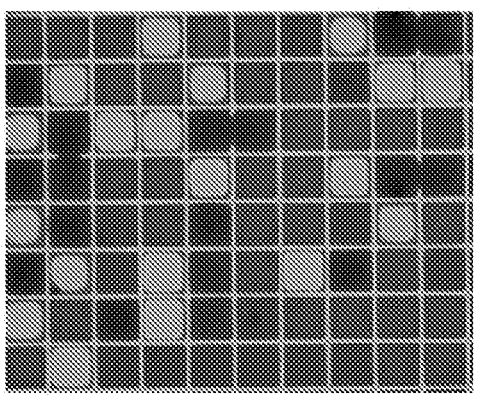
FIG. 2 illustrates an observation result of ink driven by a voltage under a microscope for an ordinary electrowetting display device.

The obtained display support plate is filled with ink and an electrolyte solution, which is packaged with another support plate to prepare an electrowetting display device, and a phenomenon of driving the ink by a voltage is observed under a microscope, thus obtaining observation results as shown in FIG. 1. A comparative test is performed with same material, and controls the materials of pixel walls and the hydrophobic insulating layer are the same as those in the Embodiment 1, thicknesses of pixel walls and the hydrophobic insulating layer are the same as the thicknesses of the pixel wall and the hydrophobic insulating layer after plasma etching in the Embodiment 1, an electrowetting display device obtained by a conventional method is prepared, and the phenomenon of driving the ink by the voltage is observed under the microscope, thus obtaining observation results as shown in FIG. 2. It can be seen from FIG. 1 and FIG. 2 that the electrowetting display device prepared by the method according to the present disclosure does not have the problem that the ink crosses over the wall, while the electrowetting display device prepared by the conventional method has the problem that the ink crosses over the wall due to insufficient hydrophilicity of pixel walls.

Figure 3:
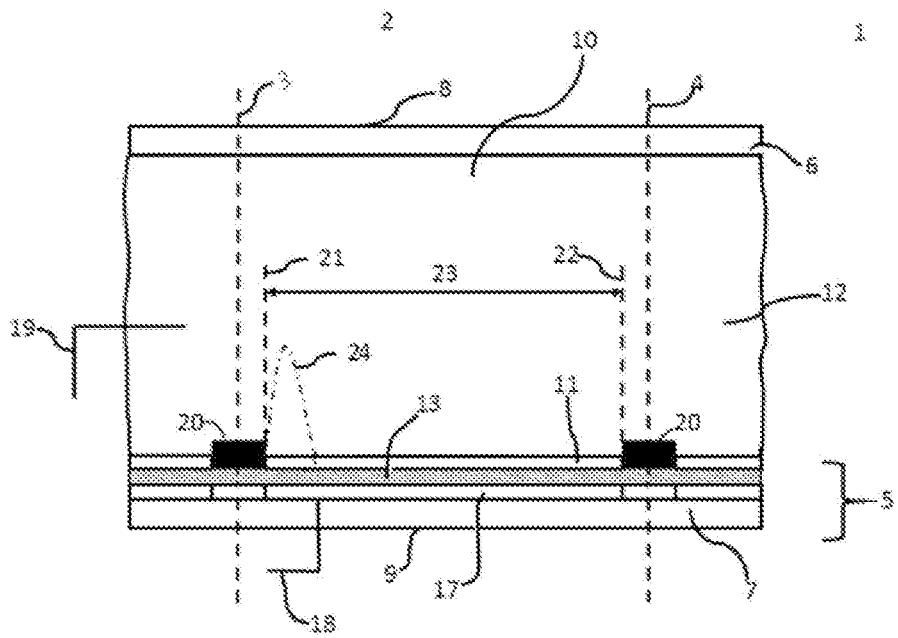
FIG. 3 is a section view of a pixel structure of the electrowetting display device according to the Embodiment 1.
Figure 4:
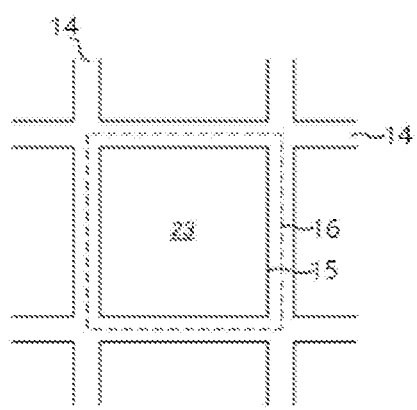
FIG. 4 is a partial top view showing a lower substrate according to the Embodiment 1.

A partial section view of an electrowetting display device prepared using a display support plate in the Embodiment 1 is shown in FIG. 3, and a partial top view showing a lower substrate is shown in FIG. 4. A display device 1 comprises a plurality of pixels 2, and only one of the pixels 2 is shown in FIG. 1. A lateral range of the pixel 2 is represented by two dashed lines 3 and 4 in the drawing. The pixel 2 comprises a display support plate 5 (i.e., a lower support plate) and an upper support plate. The display support plate 5 and the upper support plate 6 can be separate components of each of the pixels 2 or can also be shared by a plurality of pixels 2. The support plates 5 and 6 can comprise substrates 6 and 7, and the substrates 6 and 7 are glass or polymer, and can be rigid substrates or flexible substrates. Pixel walls 20 are arranged on the display support plate 5, and in the present embodiment, pixel walls 20 are arranged on the hydrophobic insulating layer 13 of the display support plate 5.

The display device has a viewing surface 8 and a back surface 9, and an image or a display formed by the display device on the viewing surface 8 can be viewed. In the drawing, the display support plate 5 faces the back surface 9; the upper support plate 6 faces the viewing surface; and optionally, the display support plate 5 can face the viewing surface 8. The display device can be a reflective type, a transmissive type, or a transmissive and reflective type. The display device can be a segmented display type, in which an image can be composed of segments, and each segment comprises several pixels. The display device can be an active array-driven display type or a passive driven display device. The plurality of pixels can be monochromatic. For a color display device, the pixels can be grouped, and each group has different color; and optionally, individual pixel can also display different colors.

The space 10 between the display support plate 5 and the upper support plate is filled with two fluids: a first fluid 11 (being usually ink) and a second fluid 12 (being usually an electrolyte solution). The second fluid 12 is immiscible with the first fluid 11. The second fluid 12 is conductive or electropolar, and can be water or a salt solution such as an aqueous solution of potassium chloride. Preferably, the second fluid 12 is transparent, but can also be colored, white, absorbent or reflective. The first fluid 11 is non-conductive, and can be, for example, an alkane such as hexadecane or (silicone) oil.

The first fluid 11 absorbs at least a portion of the spectrum, and the first fluid 11 can be transmissive for a portion of the spectrum to form a color filter. For this purpose, the first fluid 11 can be dyed by adding pigment particles or dyes. Optionally, the first fluid 11 can be black, that is, all parts of the spectrum are fully absorbed, or reflected. A reflecting layer can reflect the entire visible spectrum to make the layer appear white, or reflect a portion of the visible spectrum to make the layer colored.

The display support plate 5 comprises a hydrophobic insulating layer 13. The hydrophobic insulating layer 13 can be transparent or reflective, and in order to avoid short circuit between electrodes arranged in second fluid 12 and under the insulating layer, the hydrophobic insulating layer 13 is preferably a continuous layer extending over the plurality of pixels 2, as shown in FIG. 3.

The first fluid 11 is preferentially adhered to the hydrophobic insulating layer 13, because the first fluid has a higher surface wettability with respect to the hydrophobic insulating layer 13 than the second fluid 12. The wettability refers to a relative affinity of a fluid to a solid surface.

Each of the pixels 2 comprises an electrode 17 as a part of the display support plate 5. The electrode 17 is separated from the fluid by the hydrophobic insulating layer 13; and the electrode 17 can be any desired shape or form. It is schematically shown in the drawing that a voltage signal is supplied to the electrode 17 of the pixel through a signal line 18. A second signal line 19 is connected with the electrode contacted with the conductive second fluid 12. The electrode is shared by all elements when all elements are fluidly connected with each other by the second fluid 12 and share the second fluid without being blocked by a wall. The pixel 2 can be controlled by a voltage V applied by signal lines 18 and 19. The electrode 17 on the substrate 7 is coupled to a display driving system. In the display device having the pixels arranged in an array, the electrode on the substrate 7 can be coupled to a control line array.

The first fluid 11 is confined to one pixel by walls 20 along a cross section of the pixel. The cross section of the pixel can be any shape; and when the pixels are arranged in an array, the cross section is usually square or rectangular. Although walls are considered to be convex structures arranged on the hydrophobic insulating layer 13, walls can also be surface layers of the support plates that repel the first fluid 11, such as hydrophilic layers or weakly hydrophobic layers. The wall can extend from the display support plate to the second support plate, but can also extend partially from the display support plate to the second support plate as shown in FIG. 1. The range of the pixel represented by dashed lines 3 and 4 is defined by a center of walls 20. An area between the walls of the pixels represented by dashed lines 21 and 22 is referred to as a display area 23 on which a display effect is generated.

FIG. 4 is a top view showing a square pixel of the support plate 5. In FIG. 4, a range of a center pixel (corresponding to dashed lines 3 and 4 in FIG. 3) is represented by dashed line 16. A line 15 represents an inner boundary of pixel walls 20; and the line is also a side of the display area 23. The pattern of pixel walls 20 covers a first area 14.

When no voltage is applied between the electrodes, the first fluid 11 forms a layer between the pixel walls 20, as shown in FIG. 3. Applying a voltage can cause the first fluid to contract, for example, against a wall, as shown by a dashed line shape 24 in FIG. 3. The controllable shape of the first fluid is used as a light valve operating pixel to provide a display effect in the display area 23.

Embodiment 2

Firstly, a substrate having an electrode layer is prepared; a hydrophobic insulating layer is prepared on the electrode layer, wherein the hydrophobic insulating layer is a single-layer Hyflon material with a thickness of 600 nm; hydrophilic modification is performed on the hydrophobic insulating layer; pixel walls are prepared on the modified hydrophobic insulating layer by a photoetching process, wherein pixel walls are made of a hydrophilic material photoresist KMPR with a thickness of 4 μm; plasma etching is performed on the substrate having pixel walls, wherein the power of the plasma etching is 100 W/m$^2$ and the etching lasts for 100 s; and the substrate subjected to the plasma etching is baked at 180° C. to recover the hydrophobicity of the hydrophobic insulating layer, so as to obtain the electrowetting display support plate. Water droplet angle tests are respectively performed on pixel walls before the plasma etching, pixel walls after the plasma etching and pixel walls after heat treatment, and experimental results are shown in Table 3. The water droplet angle tests are respectively performed on the hydrophobic insulating layer before the hydrophilic modification, the hydrophobic insulating layer after the plasma etching and the hydrophobic insulating layer after the heat treatment, and experimental results are shown in Table 4.

TABLE 3

Water Droplet Angle Test Results of Pixel Walls [Table 3]

| Initial advancing angle | Initial receding angle | Advancing angle after etching | Receding angle after etching | Advancing angle after heat treatment | Receding angle after heat treatment |
|---|---|---|---|---|---|
| 95 ± 5° | 65 ± 5° | 15 ± 5° | 15 ± 5° | 70 ± 5° | 38 ± 5° |

TABLE 4

Water Droplet Angle Test Results of Hydrophobic Insulating Layer [Table 4]

| Initial advancing angle | Initial receding angle | Advancing angle after etching | Receding angle after etching | Advancing angle after heat treatment | Receding angle after heat treatment |
|---|---|---|---|---|---|
| 120 ± 5° | 110 ± 5° | 115 ± 5° | 50 ± 10° | 120 ± 5° | 115 ± 5° |

Embodiment 3

Firstly, a substrate having an electrode layer is prepared; pixel wall are prepared on the substrate having an electrode layer, wherein pixel walls are made of a hydrophilic material photoresist SU8-3005 with a thickness of 20 μm; a layer of hydrophobic insulating layer is covered on an area that are surrounded by the surface of the pixel wall and a groove area surrounded by pixel walls on the substrate, wherein the hydrophobic insulating layer is made of amorphous fluoropolymer Cytop with a thickness of 2000 nm; the substrate having the hydrophobic layer is heated until the hydrophobic layer material is vitrified, and the hydrophobic layer is tightly adhered to pixel walls; at least one protective layer is arranged on the hydrophobic layer, and the protective layer at least completely covers the hydrophobic layer at a bottom of the groove area surrounded by the pixel wall; the hydrophobic layer on the surface of the pixel wall is removed; the protective layer is removed; plasma etching is performed on the substrate having the pixel wall, wherein a power of the plasma etching is 1000 W/m$^2$ and the etching lasts for 300 s; and the substrate subjected to the plasma etching is baked at 140° C. to recover a hydrophobicity of the hydrophobic insulating layer, so as to obtain an electrowetting display support plate.

Embodiment 4

Firstly, a substrate having an electrode layer is prepared; a dielectric layer is prepared on the substrate having an electrode layer, wherein the dielectric layer is a silicon oxide layer or a silicon nitride layer with a thickness of 200 μm; a pixel wall is prepared on the dielectric layer, wherein the pixel wall is made of a hydrophilic material photoresist SU8-3005 with a thickness of 2 μm; a layer of hydrophobic layer is covered on a surface of the pixel wall and a groove area surrounded by the pixel wall on the substrate, wherein the hydrophobic layer is made of AF1600 with a thickness of 200 nm; the substrate having the hydrophobic layer is heated until the hydrophobic layer material is vitrified, and the hydrophobic layer is tightly adhered to the pixel wall; at least one protective layer is arranged on the hydrophobic layer, and the protective layer at least completely covers the hydrophobic layer at a bottom of the groove area surrounded by pixel walls; the hydrophobic layer on the surface of the pixel wall is removed; the protective layer is removed; plasma etching is performed on the substrate having pixel walls, wherein the power of the plasma etching is 30 W/m$^2$ and the etching lasts for 10 s; and the substrate subjected to the plasma etching is baked at 250° C. to recover a hydrophobicity of the hydrophobic layer, so as to obtain an electrowetting display support plate.

What is claimed:

1. A method for preparing an electrowetting display support plate, comprising the following steps:
   preparing a substrate having an electrode layer;
   preparing a hydrophobic insulating layer and pixel walls on the substrate having an electrode layer, the pixel walls being made of hydrophilic materials;
   performing plasma etching on the substrate having pixel walls, a power of the plasma etching being 30 W/m$^2$ to 1,000 W/m$^2$; and
   heating the substrate subjected to the plasma etching, so as to recover a hydrophobicity of the hydrophobic insulating layer.

2. The method for preparing an electrowetting display support plate according to claim 1, wherein the plasma etching lasts for 10 s to 300 s.

3. The method for preparing an electrowetting display support plate according to claim 1, wherein a thickness of the hydrophobic insulating layer subjected to the etching is 200 nm to 2000 nm.

4. The method for preparing an electrowetting display support plate according to claim 1, wherein a thickness of pixel walls subjected to the etching is 2 μm to 20 μm.

5. The method for preparing an electrowetting display support plate according to claim 1, wherein a heating temperature of the substrate subjected to the plasma etching is 140° C. to 250° C.

6. The method for preparing an electrowetting display support plate according to claim 1, wherein the hydrophobic insulating layer is a single layer structure or a composite layer structure, and when the hydrophobic insulating layer is the composite layer structure, the hydrophobic insulating layer comprises a dielectric layer and a hydrophobic layer arranged on the dielectric layer.

7. The method for preparing an electrowetting display support plate according to claim 6, wherein the hydrophobic insulating layer is the single layer structure, and the hydrophobic insulating layer is made of amorphous fluoropolymer.

8. The method for preparing an electrowetting display support plate according to claim 6, wherein the hydrophobic insulating layer is the composite layer structure, the dielectric layer is made of fluoropolymer or inorganic materials, and the hydrophobic layer is made of amorphous fluoropolymer.

9. The method for preparing an electrowetting display support plate according to claim 1, wherein steps for preparing the hydrophobic insulating layer and pixel walls on the substrate having an electrode layer comprise:
preparing the hydrophobic insulating layer on the electrode layer;
performing hydrophilic modification on the hydrophobic insulating layer; and
preparing pixel walls on the modified hydrophobic insulating layer.

10. The method for preparing an electrowetting display support plate according to claim 2, wherein the hydrophobic insulating layer is a single layer structure or a composite layer structure, and when the hydrophobic insulating layer is the composite layer structure, the hydrophobic insulating layer comprises a dielectric layer and a hydrophobic layer arranged on the dielectric layer.

11. The method for preparing an electrowetting display support plate according to claim 3, wherein the hydrophobic insulating layer is a single layer structure or a composite layer structure, and when the hydrophobic insulating layer is the composite layer structure, the hydrophobic insulating layer comprises a dielectric layer and a hydrophobic layer arranged on the dielectric layer.

12. The method for preparing an electrowetting display support plate according to claim 4, wherein the hydrophobic insulating layer is a single layer structure or a composite layer structure, and when the hydrophobic insulating layer is the composite layer structure, the hydrophobic insulating layer comprises a dielectric layer and a hydrophobic layer arranged on the dielectric layer.

13. The method for preparing an electrowetting display support plate according to claim 5, wherein the hydrophobic insulating layer is a single layer structure or a composite layer structure, and when the hydrophobic insulating layer is the composite layer structure, the hydrophobic insulating layer comprises a dielectric layer and a hydrophobic layer arranged on the dielectric layer.

14. The method for preparing an electrowetting display support plate according to claim 2, wherein steps for preparing the hydrophobic insulating layer and pixel walls on the substrate having an electrode layer comprise:
preparing the hydrophobic insulating layer on the electrode layer;
performing hydrophilic modification on the hydrophobic insulating layer; and
preparing pixel walls on the modified hydrophobic insulating layer.

15. The method for preparing an electrowetting display support plate according to claim 3, wherein steps for preparing the hydrophobic insulating layer and pixel walls on the substrate having an electrode layer comprise:
preparing the hydrophobic insulating layer on the electrode layer;
performing hydrophilic modification on the hydrophobic insulating layer; and
preparing pixel walls on the modified hydrophobic insulating layer.

16. The method for preparing an electrowetting display support plate according to claim 4, wherein steps for preparing the hydrophobic insulating layer and pixel walls on the substrate having an electrode layer comprise:
preparing the hydrophobic insulating layer on the electrode layer;
performing hydrophilic modification on the hydrophobic insulating layer; and
preparing pixel walls on the modified hydrophobic insulating layer.

17. The method for preparing an electrowetting display support plate according to claim 5, wherein steps for preparing the hydrophobic insulating layer and pixel walls on the substrate having an electrode layer comprise:
preparing the hydrophobic insulating layer on the electrode layer;
performing hydrophilic modification on the hydrophobic insulating layer; and
preparing pixel walls on the modified hydrophobic insulating layer.

* * * * *